(12) United States Patent
Karihara

(10) Patent No.: US 8,511,338 B2
(45) Date of Patent: Aug. 20, 2013

(54) WATER FLOW DETECTION DEVICE

(75) Inventor: Yukinori Karihara, Ichinoseki (JP)

(73) Assignee: Senju Sprinkler Co., Ltd., Tokyo (JP)

( * ) Notice: Subject to any disclaimer, the term of this patent is extended or adjusted under 35 U.S.C. 154(b) by 402 days.

(21) Appl. No.: 12/994,868

(22) PCT Filed: Jun. 4, 2009

(86) PCT No.: PCT/JP2009/002535
§ 371 (c)(1),
(2), (4) Date: Nov. 29, 2010

(87) PCT Pub. No.: WO2009/147860
PCT Pub. Date: Dec. 10, 2009

(65) Prior Publication Data
US 2011/0079301 A1 Apr. 7, 2011

(30) Foreign Application Priority Data
Jun. 4, 2008 (JP) .................... 2008-147095

(51) Int. Cl.
*F16K 15/00* (2006.01)
*G01P 13/00* (2006.01)

(52) U.S. Cl.
USPC .............. 137/527.8; 137/554; 200/81.9 R

(58) Field of Classification Search
USPC .............. 137/527, 527.8, 543–544, 553–554; 200/81.9 R
See application file for complete search history.

(56) References Cited

U.S. PATENT DOCUMENTS

| | | | | |
|---|---|---|---|---|
| 2,740,858 | A | * | 4/1956 | Euler ................ 200/81.9 R |
| 3,448,442 | A | * | 6/1969 | Hube ................ 340/529 |
| 3,501,605 | A | * | 3/1970 | Hutchinson et al. ..... 200/81.9 R |

(Continued)

FOREIGN PATENT DOCUMENTS

| | | |
|---|---|---|
| JP | 09-140822 A | 6/1997 |
| JP | 2001-000574 A | 1/2001 |

(Continued)

OTHER PUBLICATIONS

International Search Report for PCT Patent App. No. PCT/JP2009/002535 (Jul. 21, 2009).

*Primary Examiner* — John Rivell
*Assistant Examiner* — David Colon Morales
(74) *Attorney, Agent, or Firm* — Cermak Nakajima LLP; Tomoko Nakajima

(57) ABSTRACT

In a water flow detection device in which signals are output in response to movement of a detection rod that rotates in conjunction with the opening of a valve body, a pin that supports the detection rod is capable of being provided so as to be constantly parallel to a valve shaft of the valve body, and a water flow is capable of being accurately detected by the rotation of the detection rod while the detection rod contacts the valve body without being inclined, the detection rod rotating in response to opening and closing of the valve body. Accordingly, the water flow detection device includes a retainer and an extended block as holding members that hold the pin of the detection rod such that the pin is parallel to the valve shaft of the valve body, the retainer having a bearing for the pin, and the extended block holding the retainer to fix the retainer to the main body with a bolt. Furthermore, the retainer and the extended block respectively have a protrusion and a groove as rotation-restricting sections, and these members engage with each other.

15 Claims, 12 Drawing Sheets

(56) References Cited

U.S. PATENT DOCUMENTS

| | | | |
|---|---|---|---|
| 3,729,604 A * | 4/1973 | Groff et al. | 200/81.9 R |
| 3,731,025 A * | 5/1973 | Filliung | 200/81.9 R |
| 3,845,259 A | 10/1974 | Spurr | |
| 4,074,097 A | 2/1978 | Hutchinson et al. | |
| 4,614,122 A * | 9/1986 | Graves | 73/861.74 |
| 4,725,700 A | 2/1988 | Zoludow | |
| 4,805,665 A * | 2/1989 | League | 137/554 |
| 6,152,173 A * | 11/2000 | Makowan | 137/556.3 |
| 2007/0095406 A1 * | 5/2007 | Colton et al. | 137/553 |

FOREIGN PATENT DOCUMENTS

| | | |
|---|---|---|
| JP | 2003-111863 A | 4/2003 |
| JP | 2006-055400 A | 3/2006 |
| JP | 2007-003377 A | 1/2007 |
| JP | 2007-029584 A | 2/2007 |

\* cited by examiner

Prior Art

WATER FLOW DETECTION DEVICE

This application is a national phase entry under 35 U.S.C. §371 of PCT Patent Application No. PCT/JP2009/002535, filed on Jun. 4, 2009, which claims priority under 35 U.S.C. §119 to Japanese Patent Application No. 2008-147095, filed Jun. 4, 2008, both of which are incorporated by reference.

TECHNICAL FIELD

The present invention relates to a water flow detection device that detects a water flow in a pipe filled with water and that then outputs signals, and especially relates to a water flow detection device that is provided on a pipe of fire-fighting equipment.

BACKGROUND ART

A water flow detection device is a device that is provided on a pipe of fire-fighting equipment such as a sprinkler system or a foam fire-fighting system and that detects a water flow in the pipe and then outputs signals.

The water flow detection device has an inner structure of a check valve. A valve body divides the inside of the device into a primary chamber and a secondary chamber, and the check valve is normally in a closed state. The primary and secondary chambers are normally filled with water. A pipe connected to the primary chamber (hereinafter referred to as a "primary side pipe") is connected to a water source such as a water storage tank, and a pipe connected to the secondary chamber (hereinafter referred to as a "secondary side pipe") is connected to a dispersion head such as a sprinkler head or a form head.

The water flow detection device is provided to detect the operation of the dispersion head connected to the secondary side pipe. For example, in cases where a sprinkler head operates, water that fills the secondary side pipe is discharged from the sprinkler head with the result that the internal pressure of the secondary side pipe is reduced. Accordingly, internal pressure of the secondary chamber of the water flow detection device is decreased with the result that an effect of the pressure on the valve body enters an imbalance state. The force acting on the valve body from the side of the primary chamber exceeds the force acting on the valve body from the side of the secondary chamber with the result that the valve body opens.

The water flow detection device has a switching device that detects the opening of the valve body, and the switching device operates and then outputs signals. The output signals are connected to a monitoring apparatus installed in, for example, an administrative room of a building, and the monitoring apparatus outputs signals to inform an administrative person of the operation of the sprinkler head.

A typical example of such a water flow detection device is known, which has a configuration including: a valve body having a valve body that employs a structure of a swing check valve; a detection rod that moves in conjunction with the opening of the valve body; and a switch that is provided outside of the valve body and that detects the movement of the detection rod to output signals, the movement being in conjunction with the opening of the valve body (for example, see Patent Document 1).

As illustrated in FIG. 14, the water flow detection device disclosed in the Patent Document 1 has a rotational arm 31, as a detection rod, that is provided in the form of a rod and that serves so as to operate a switch. An end of the rotational arm 31 has a paddle portion 31b that contacts an upper portion of a valve body D, and another end of the rotational arm 31 protrudes to the outside of the valve body and has a switch cam portion 31c. A reed switch 35 that is capable of outputting signals is provided in the vicinity of the switch cam portion 31c. The rotational arm 31 is supported by a rotational shaft 32 that is horizontally disposed between the valve body and the reed switch 35. In cases where the paddle portion 31b moves in response to the opening of the valve body D, the rotational arm 31 rotates around the rotational shaft 32, so that the switch cam portion 31c operates the reed switch 35.

Patent Document 1: Japanese Unexamined Patent Application Publication No. 2006-55400

DISCLOSURE OF THE INVENTION

Problems to be Solved by the Invention

The rotational shaft 32 of the water flow detection device is provided on a reed switch-attaching sleeve 29 that serves to attach the reed switch 35 to the valve body (check valve case 21). The attaching sleeve 29 is connected to the valve body with a screw.

Accordingly, in cases where the attaching sleeve 29 is screwed into the valve body, the rotational shaft 32 may not be horizontally fixed and may be provided in an inclined state. Alternatively, even if the rotational shaft 32 has been horizontally fixed in the initial state, in cases where the attaching sleeve 29 is removed and is then attached again for the purpose of maintenance, the attaching sleeve 29 may be fixed in a non-horizontal manner and may be disposed in an inclined state. Therefore, the rotational shaft 32 of the switch-operating rotational arm 31 may not be parallel to a rotational shaft of the valve body D with the result that the switch-operating rotational arm 31 may contact the valve D in an inclined state.

In cases where the switch-operating rotational arm 31 contacts the valve body D in an inclined state as described above, the switch-operating rotational arm 31 may act in an unwanted direction when the valve body D opens. Accordingly, the predetermined performance may not be able to be obtained.

In view of the above problem, in the water flow detection device that detects movement of the detection rod, which rotates in response to the opening of the valve body due to generation of a water flow inside a pipe, and that then outputs signals, it is an object of the invention to provide a water flow detection device in which a rotational shaft of the detection rod is capable of being provided so as to be constantly parallel to a rotational shaft (valve shaft) of the valve body.

Means for Solving the Problems

In order to achieve the above object, there is provided the following water flow detection devices according to aspects of the invention.

(1) According to an aspect of the invention, there is provided a water flow detection device including: a main body having a valve body that employs a structure of a swing check valve; a detection rod provided so as to pass through the main body from the inside of the main body to the outside, the detection rod being rotatably supported by a pin having an axial direction that orthogonally intersects a direction in which water flows; an urging unit that urges the detection rod such that the detection rod contacts the valve body; and a switch that outputs signals in response to the rotation of the detection rod. The pin that supports the detection rod is provided inside a hollow retainer. The retainer is disposed between the main body and the switch and has a holding unit that holds a pin at a position at which the axial direction of the pin intersects a direction in which water flows.

By virtue of this aspect of the invention, the holding unit of the retainer is capable of holding the pin at a position at which the axial direction of the pin constantly intersects the direction in which water flows, the pin being disposed inside the retainer and supporting the detection rod such that the detection rod is capable of rotating.

(2) In the aspect of the invention, an engagement portion is formed on a surface of the retainer as the holding unit in the form of a protrusion, a hole, or a cutout, and an extended block is provided between the main body and the switch, the extended block having a receiving portion that mates with the engagement portion.

By virtue of this inventive configuration, the engagement portion is formed as a retainer-holding unit on a surface of the retainer in the form of the protrusion, the hole, or the cutout, and the engagement portion mates with the extended block. Accordingly, the retainer is capable of being prevented from being displaced and oscillating, and the pin provided inside the retainer is capable of being held at a position at which the axial direction of the pin constantly intersects the direction of a flow.

(3) According to another aspect of the invention, there is provided a water flow detection device including: a cylindrical main body having a valve body that employs a structure of a swing check valve and having a valve stem; a detection rod provided so as to pass through the main body from the inside of the main body to the outside, the detection rod rotating in conjunction with the opening and closing of the valve body; a pin that supports the detection rod such that the detection rod is capable of rotating; and a switch that outputs signals in response to the rotation of the detection rod. The water flow detection device includes a holding member that holds a pin such that the pin is parallel to the valve stem of the valve body, and the holding member includes a rotation-restricting section that prevents the rotation of the holding member with respect to the main body.

By virtue of this aspect of the invention, the water flow detection device includes the holding member that holds the pin such that the pin is parallel to the valve stem of the valve body, and the holding member includes the rotation-restricting section that prevents rotation of the holding member with respect to the main body. Accordingly, the rotational shaft of the detection rod is capable of being provided so as to be constantly parallel to the valve stem of the valve body, and a water flow is capable of being accurately detected owing to the rotation of the detection rod in response to the opening and closing of the valve body.

(4) In the above aspect of the invention, the holding member includes a retainer having a groove or opening that holds a pin and includes an extended block that holds the retainer to fix the retainer to the main body, and the rotation-restricting section includes a protrusion and a hollow portion that are individually provided on surfaces of the retainer and extended block, the surfaces being positioned so as to face each other.

(5) In the above aspect of the invention, the holding member includes a retainer having a groove or an opening that holds the pin and includes a housing that faces the retainer and that serves for installing the switch therein, and the rotation-restricting section includes a protrusion and a hollow portion that are individually provided on surfaces of the retainer and housing, the surfaces being positioned so as to face each other.

By virtue of these inventive configurations, the retainer is capable of holding the pin parallel to the valve stem of the valve body, and the rotation-regulating member is capable of accurately preventing the retainer from being displaced and oscillating.

(6) In the above aspect of the invention, the holding member is a housing in which the switch is disposed, the housing having a groove or an opening that holds the pin, and the rotation-restricting section includes a protrusion and a hollow portion that are individually provided on surfaces of the housing and main body, the surfaces being positioned so as to face each other.

By virtue of this inventive configuration, the housing in which the switch is provided is capable of holding the pin, and therefore other components that hold the pin are not used, and the rotation-restricting section is capable of accurately prevent the housing from being displaced and oscillating with respect to the main body.

(7) In the above aspect of the invention, the water flow detection device includes an urging unit that urges the detection rod in a direction the valve body opens.

By virtue of this inventive configuration, the rotation of the detection rod is in conjunction with the rotation of the valve body during the opening and closing of the valve body with the result that a water flow is detected, while the detection rod does not impose a closing load on the valve body. Accordingly, such a configuration is also capable of being applied to a water flow detection device having a large diameter and a structure of an actuated valve.

(8) In the above aspect of the invention, the housing that accommodates the switch is provided so as to be removable from the main body.

By virtue of this inventive configuration, the housing that accommodates the switch is used so as to be separate from the main body, so that the housing is capable of being used as a unit independent of the main body so as to be incorporated with the detection rod and a sealing member.

(9) In the above aspect of the invention, a sealing member is provided on the retainer, and the sealing member has a cylindrical portion into which the detection rod is inserted and has a collar that extends in a direction vertical to an axis of the cylindrical portion. The collar is provided such that a surface thereof is parallel to a surface of the retainer.

By virtue of this inventive configuration, a surface of the collar of the sealing member provided on the retainer is provided so as to be parallel to a surface of the retainer with interposing a washer therebetween, so that the collar of the sealing member is capable of being pressed against a surface of the retainer when pressure of water is applied to the collar from the main body of the water flow detection device. Accordingly, the collar is in close contact with the retainer, thereby being able to enhance a water proof effect.

(10) In the above aspect of the invention, a sealing member is provided on the retainer, and the sealing member has a cylindrical portion into which the detection rod is inserted and has a collar that extends in a direction vertical to an axis of the cylindrical portion. The periphery of the collar is held between the retainer and the extended block.

By virtue of this inventive configuration, the periphery of the collar is held between the retainer and the extended block, so that in cases where the rotation of the detection rod imposes an exceeding load on the sealing member, a problem that the sealing member is removed and then causes water leak is capable of being prevented.

(11) In the above aspect of the invention, two washers are interposed between the collar of the sealing member and the retainer, and the two washers are provided such that surfaces of the two washers contact each other.

By virtue of this inventive configuration, in cases where the detection rod rotates, the two washers slide so as to follow the movement of the detection rod, so that a load imposed on the collar of the sealing member is capable of being decreased.

(12) In the above aspect of the invention, a coating is applied to a surface of each of the washers.

By virtue of this inventive configuration, the washers are capable of smoothly sliding.

(13) In the above aspect of the invention, the water flow detection device includes a cylindrical holder that restricts the movement of the sealing member toward the main body.

By virtue of this inventive configuration, the sealing member is capable of being prevented from moving to the main body.

(14) In the above aspect of the invention, the holder has a hole of an elongated shape.

By virtue of this inventive configuration, the holder has the hole of the elongated shape, so that the movement of the detection rod in a direction orthogonally intersecting a direction of a flow is capable of being restricted and so that the amount (angle) of the rotation of the detection rod is capable of being controlled during the rotation parallel to the direction of a flow.

(15) In the above aspect of the invention, a case-side end of the retainer is inserted into a hole formed in the housing.

By virtue of this inventive configuration, the case-side end of the retainer is inserted into the hole formed in the housing, so that a positional relationship between the detection rod and a limit switch or limit switch pressing piece is capable of being appropriately provided, the detection rod being supported by the pin disposed inside the retainer, and the limit switch or limit switch pressing piece being disposed inside the housing.

(16) In the above aspect of the invention, an elastic main body is provided at a case-side end of the detection rod, and the elastic main body is attached to each of spring washers provided on the detection rod and inside the housing. Each of the spring washers has a rotation amount-controlling unit that controls the rotation amount of the detection rod.

This inventive configuration is capable of restricting the forced rotation of the body-side end of the detection rod in a direction in which the valve body closes.

(17) In the above aspect of the invention, a flange is formed at the body-side end of the detection rod, and the periphery of the flange has a rounded shape.

By virtue of this inventive configuration, the detection rod rotates in conjunction with the opening of the valve body, and the flange moves so as to slide over a surface of a protrusion of the valve body until the detection rod separates from the protrusion, so that an advantageous effect that the slide is smoothly performed is capable of being provided.

Advantages

In the water flow detection device according to an aspect of the invention, the rotational shaft of the detection rod is capable of being provided so as to be constantly parallel to the valve stem of the valve body, and therefore the detection rod contacts the valve body without being inclined, so that the amount of the movement of the detection rod is capable of being consistently maintained constant during the rotation of the detection rod. Accordingly, the opening of the valve body due to a water flow flowing in a pipe is capable of being consistently detected owing to the movement of the detection rod as a result of the rotation thereof in an accurate manner, thereby being able to provide a water flow detection device having high reliability of detecting operation. Especially, a water flow detection device having a structure of an actuated valve and having high reliability of detecting operation is capable of being provided, such a water flow detection device being able to be applied to one of a type having a relatively large diameter such as a nominal diameter ("nominal diameter" described in a detailed regulation on a test of a water flow detection device) of approximately 65 A (2½")~200 A (8").

BEST MODES FOR CARRYING OUT THE INVENTION

Embodiments of the invention will be hereinafter described with reference to FIGS. 1 to 13.

Figure 1:
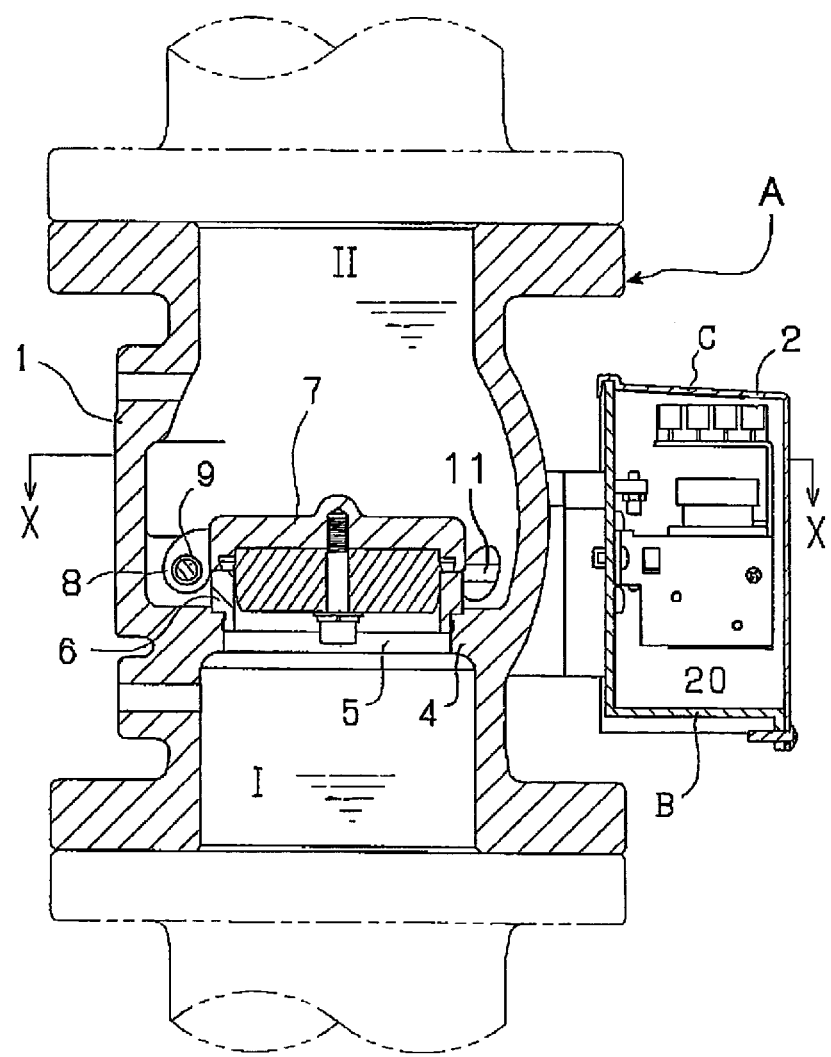
FIG. 1 is a cross-sectional view illustrating a water flow detection device according to an embodiment of the invention.
Figure 2:
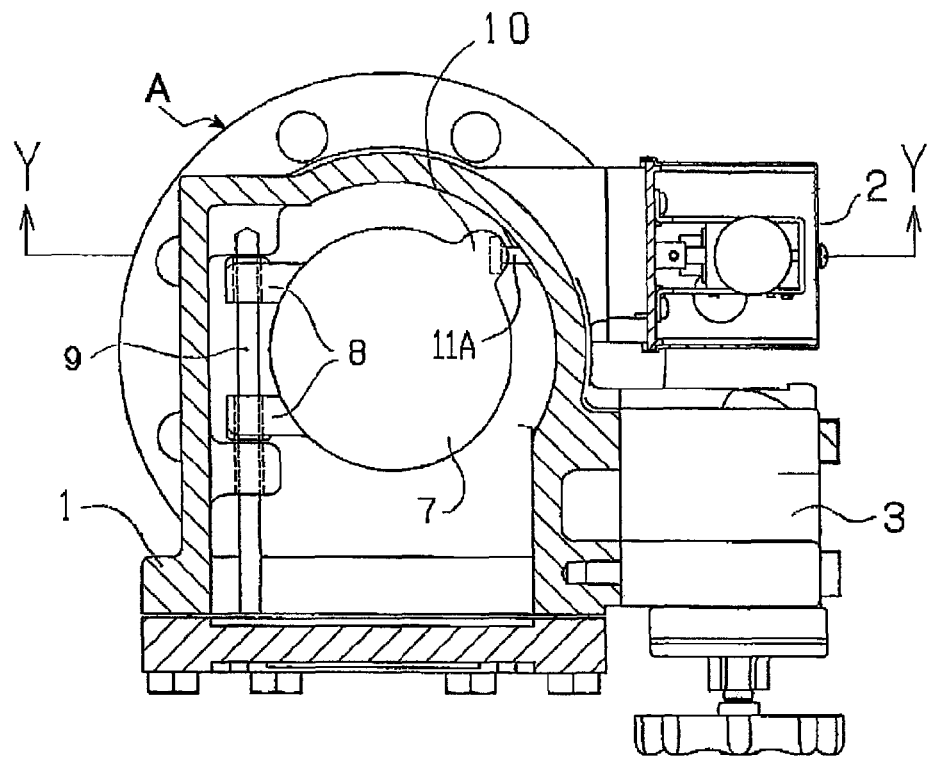
FIG. 2 is a cross-sectional view illustrating the water flow detection device taken along a line X-X in FIG. 1.
Figure 3:
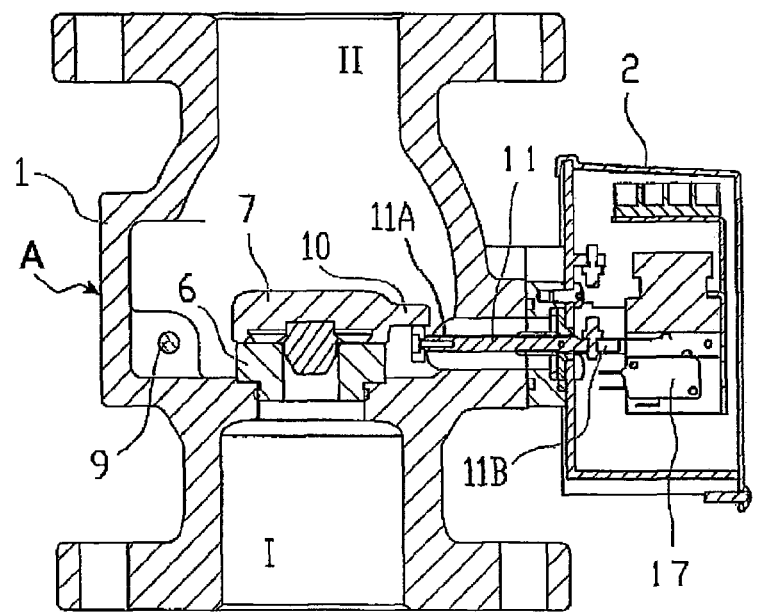
FIG. 3 is a cross-sectional view illustrating the water flow detection device taken along a line Y-Y in FIG. 2.
Figure 4:
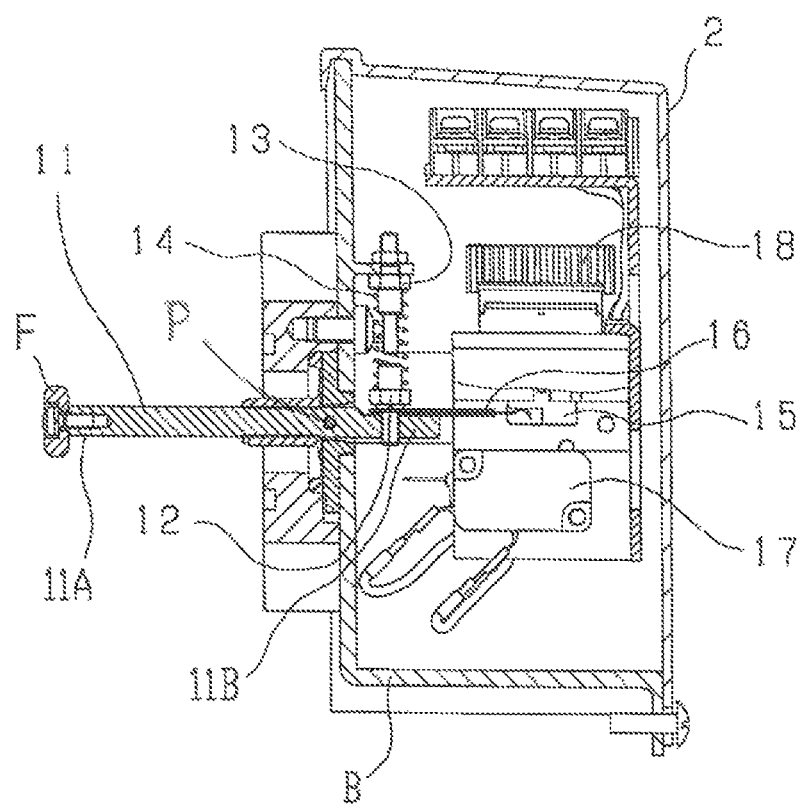
FIG. 4 is a cross-sectional view illustrating a housing in FIG. 3 in an enlarged manner.
Figure 5:
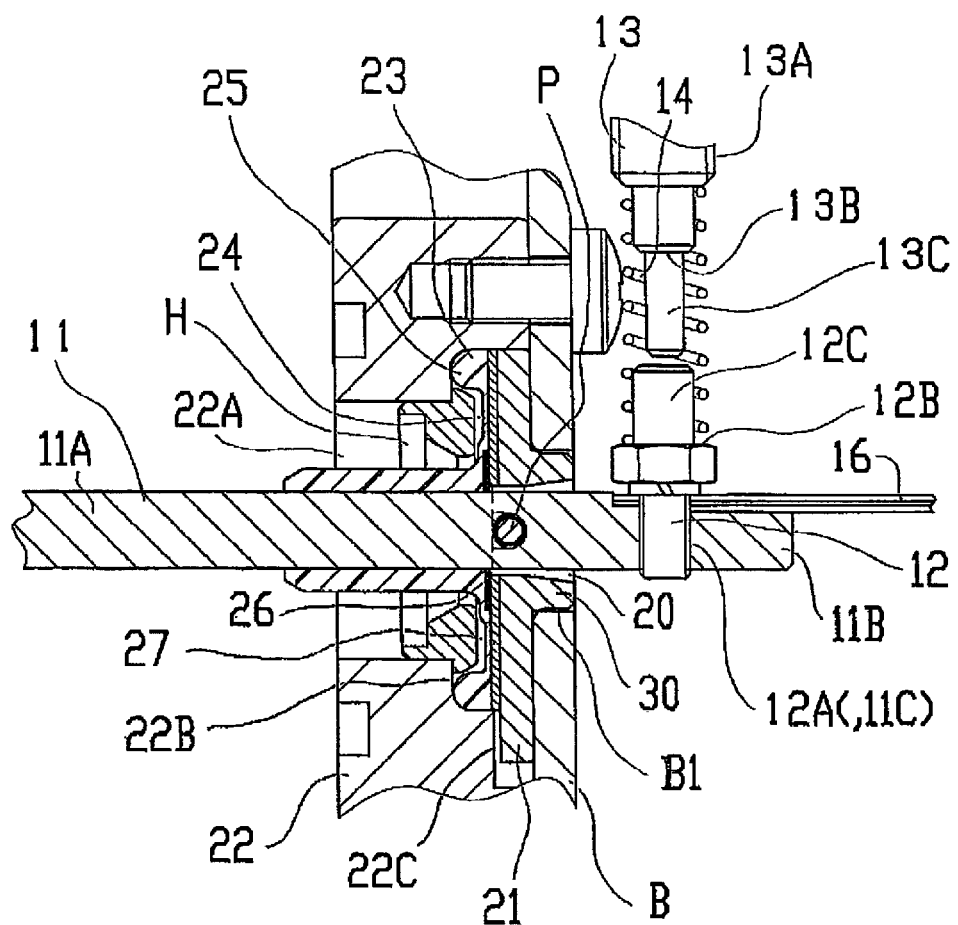
FIG. 5 is a cross-sectional view illustrating a retainer and a surrounding part thereof in FIG. 4 in an enlarged manner.
Figure 6:
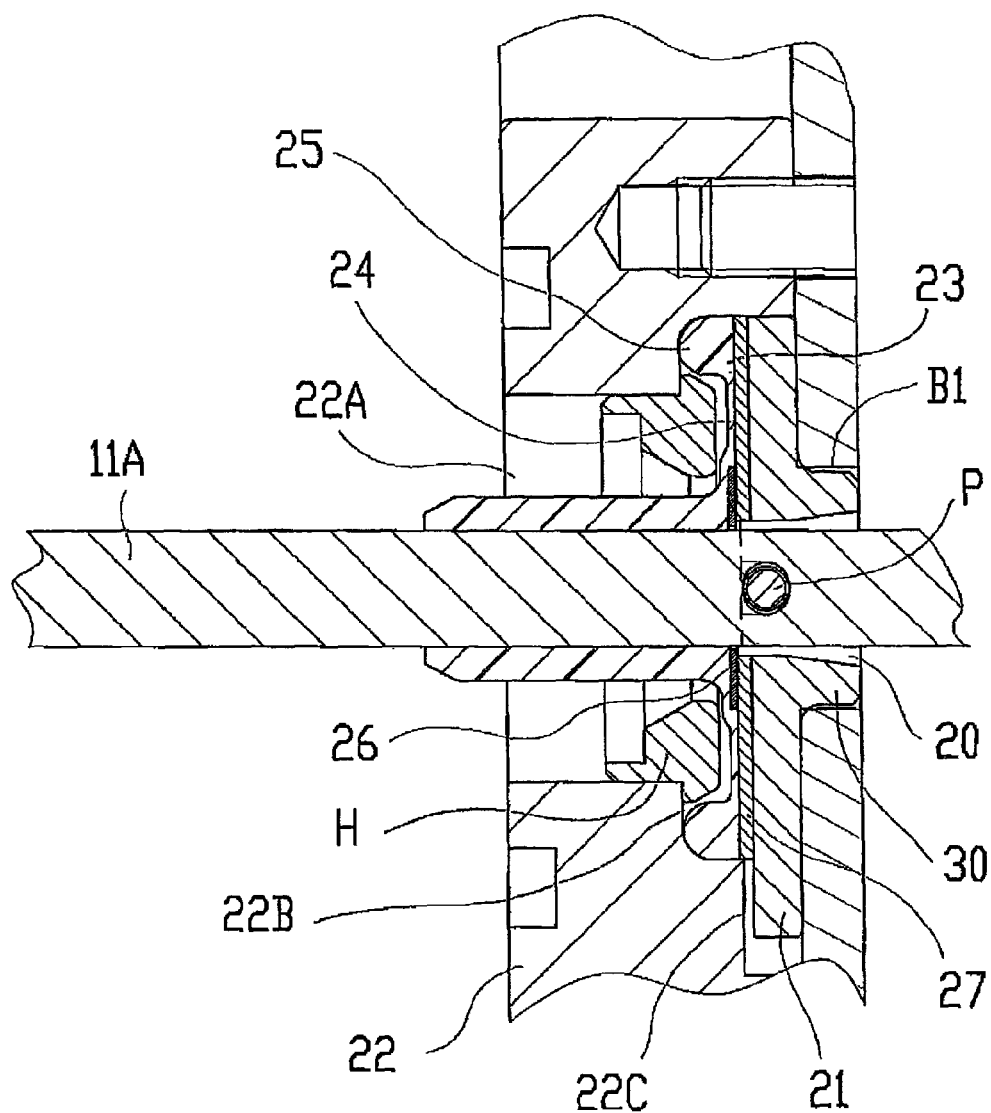
FIG. 6 is a cross-sectional view illustrating a sealing member and a surrounding part thereof in FIG. 5 in an enlarged manner.
Figure 7:
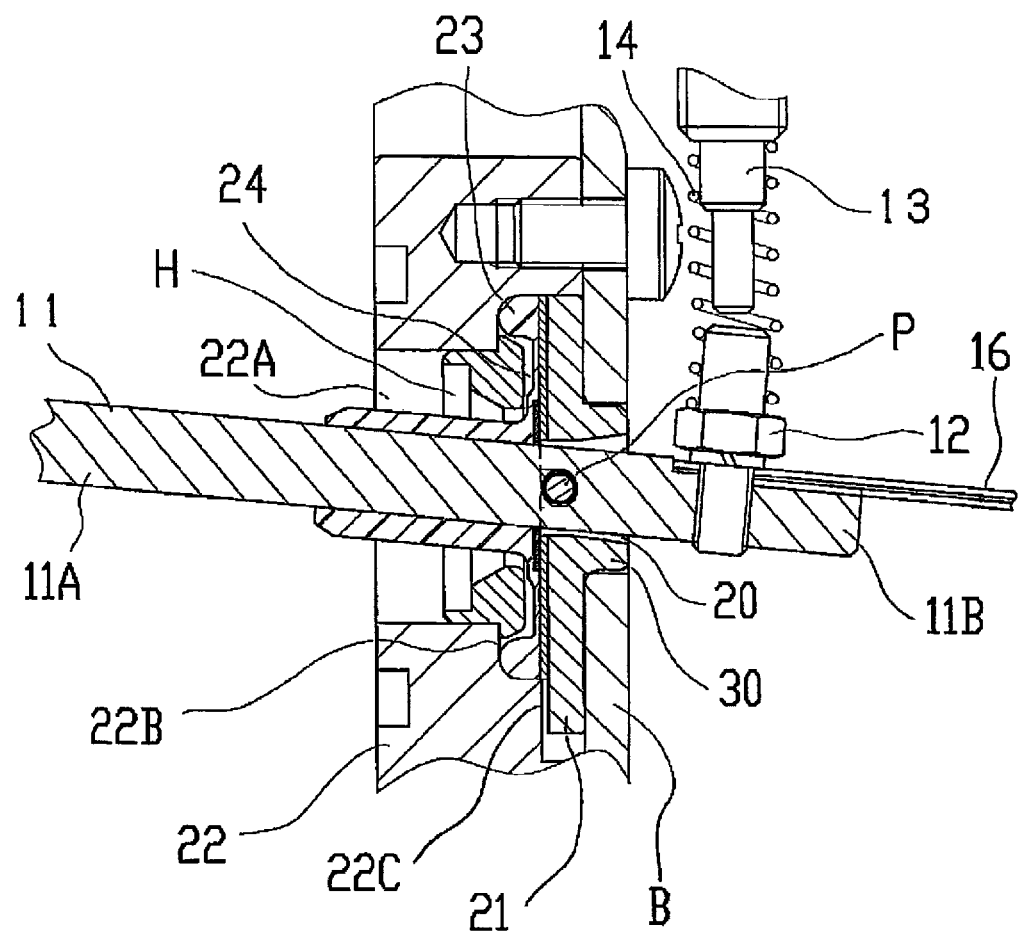
FIG. 7 is a cross-sectional view illustrating a state in which a detection rod in FIG. 5 rotates in conjunction with the opening of a valve body, in an enlarged manner.
Figure 8:
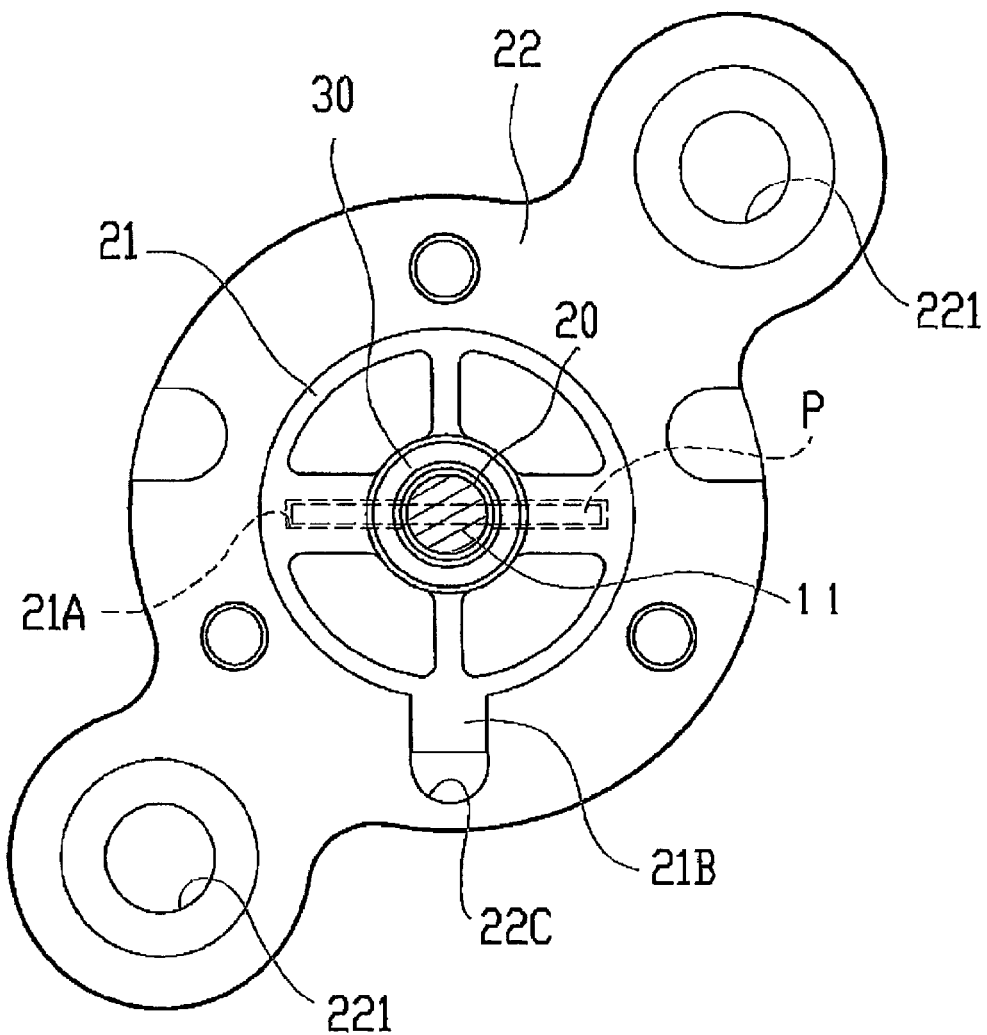
FIG. 8 is a partially assembled view illustrating an extended block and a retainer.
Figure 9:
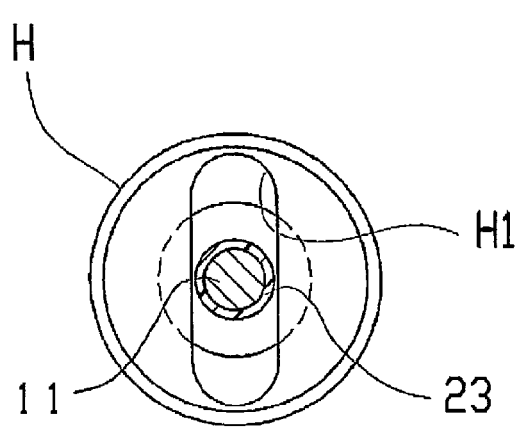
FIG. 9 illustrates an embodiment in which a holder has a hole of an elongated shape.
Figure 10:
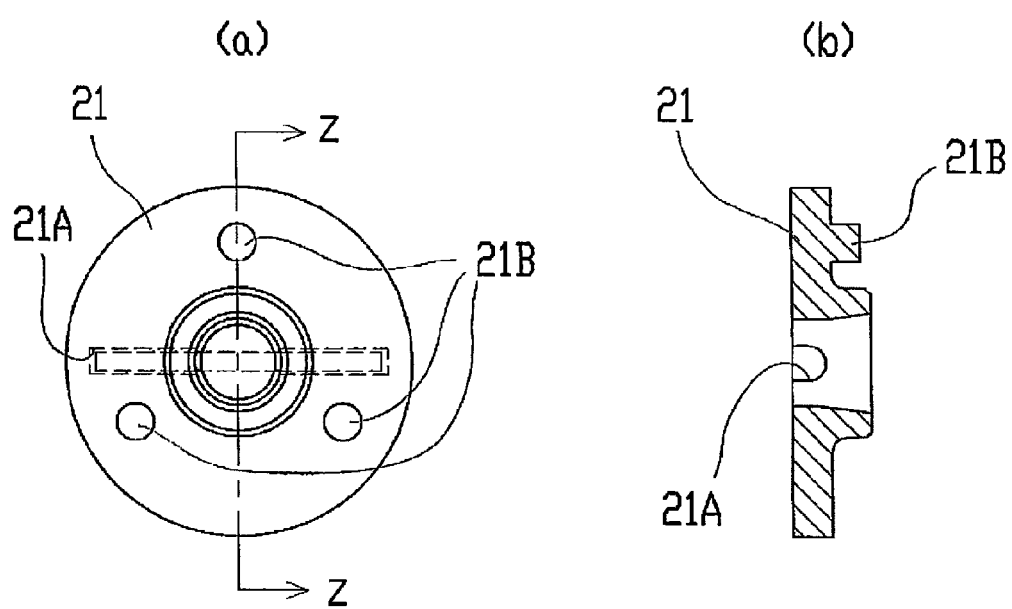
FIG. 10 illustrates another embodiment of the retainer.
Figure 11:
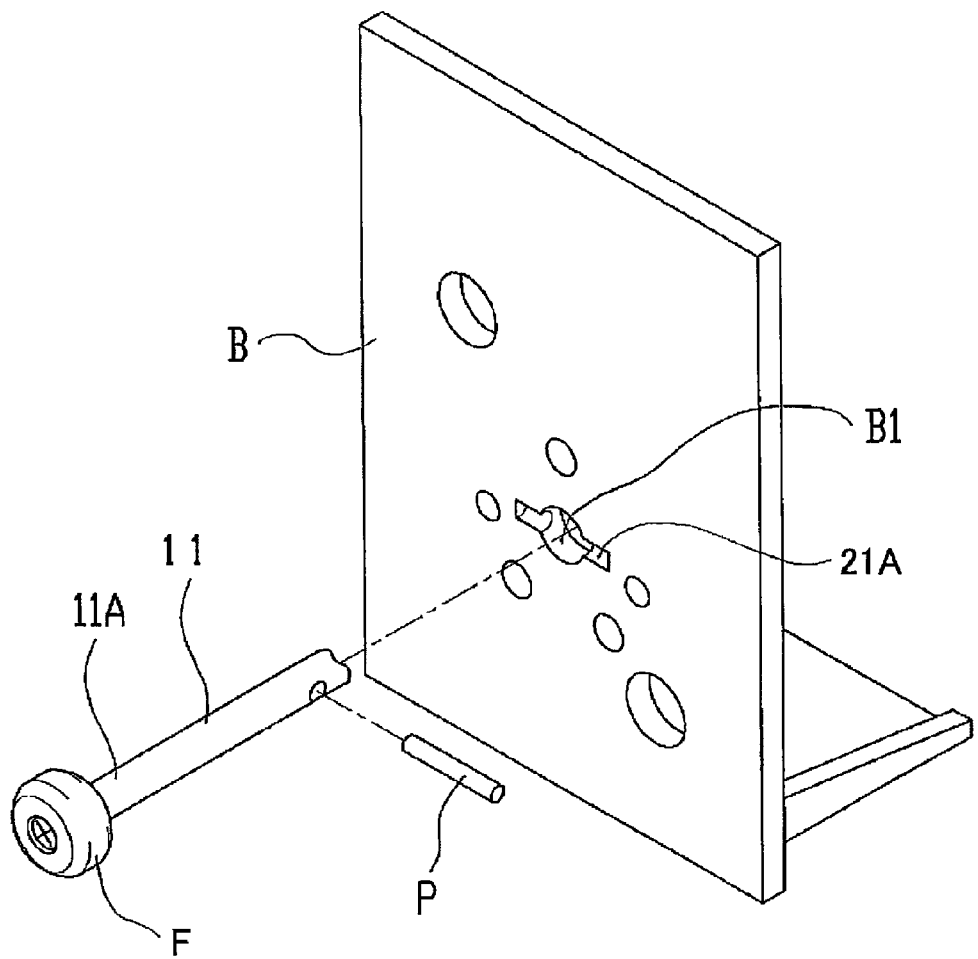
FIG. 11 illustrates an embodiment of a housing that holds a pin.
Figure 12:
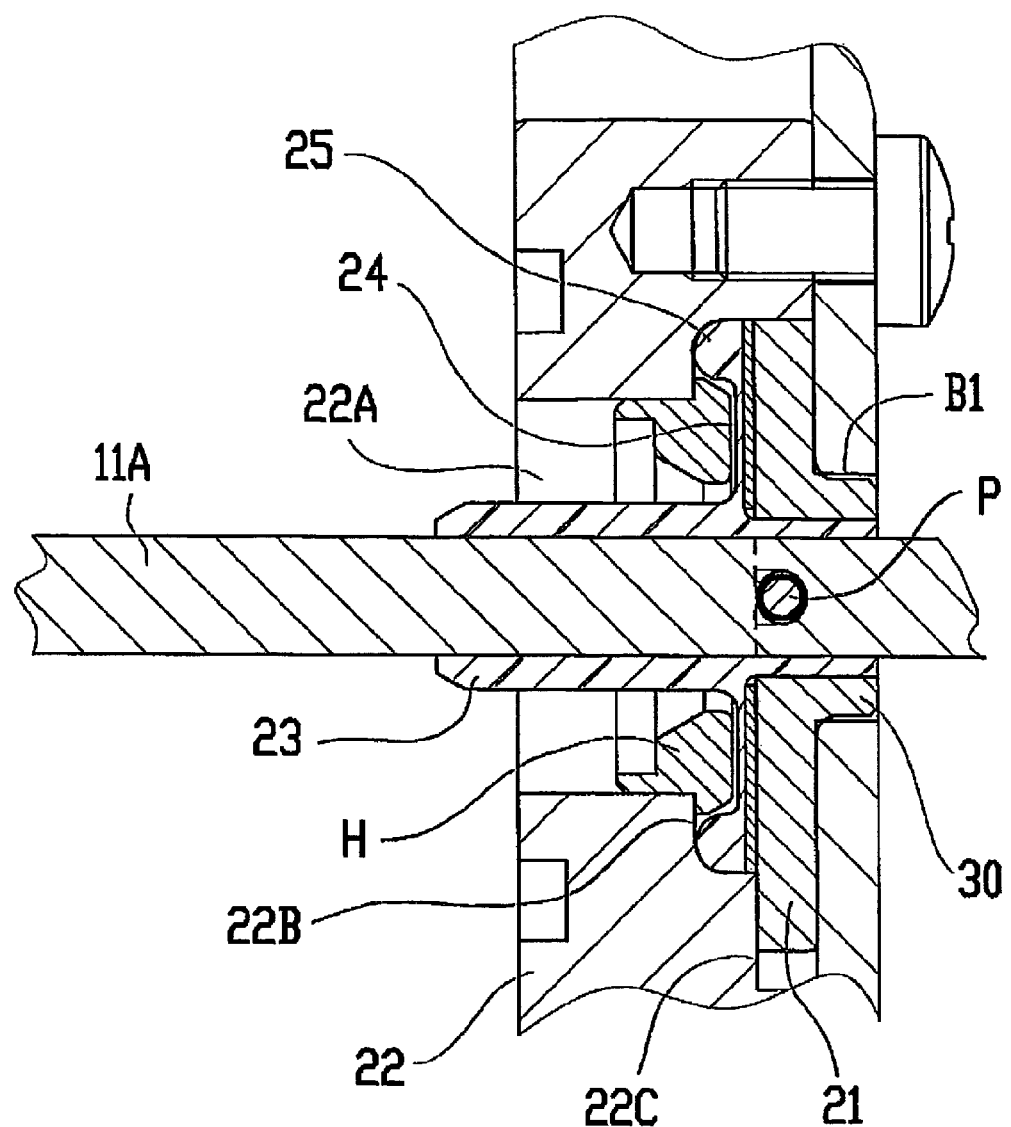
FIG. 12 is a cross-sectional view illustrating other embodiments of a sealing member and a washer in an enlarged manner.
Figure 13:
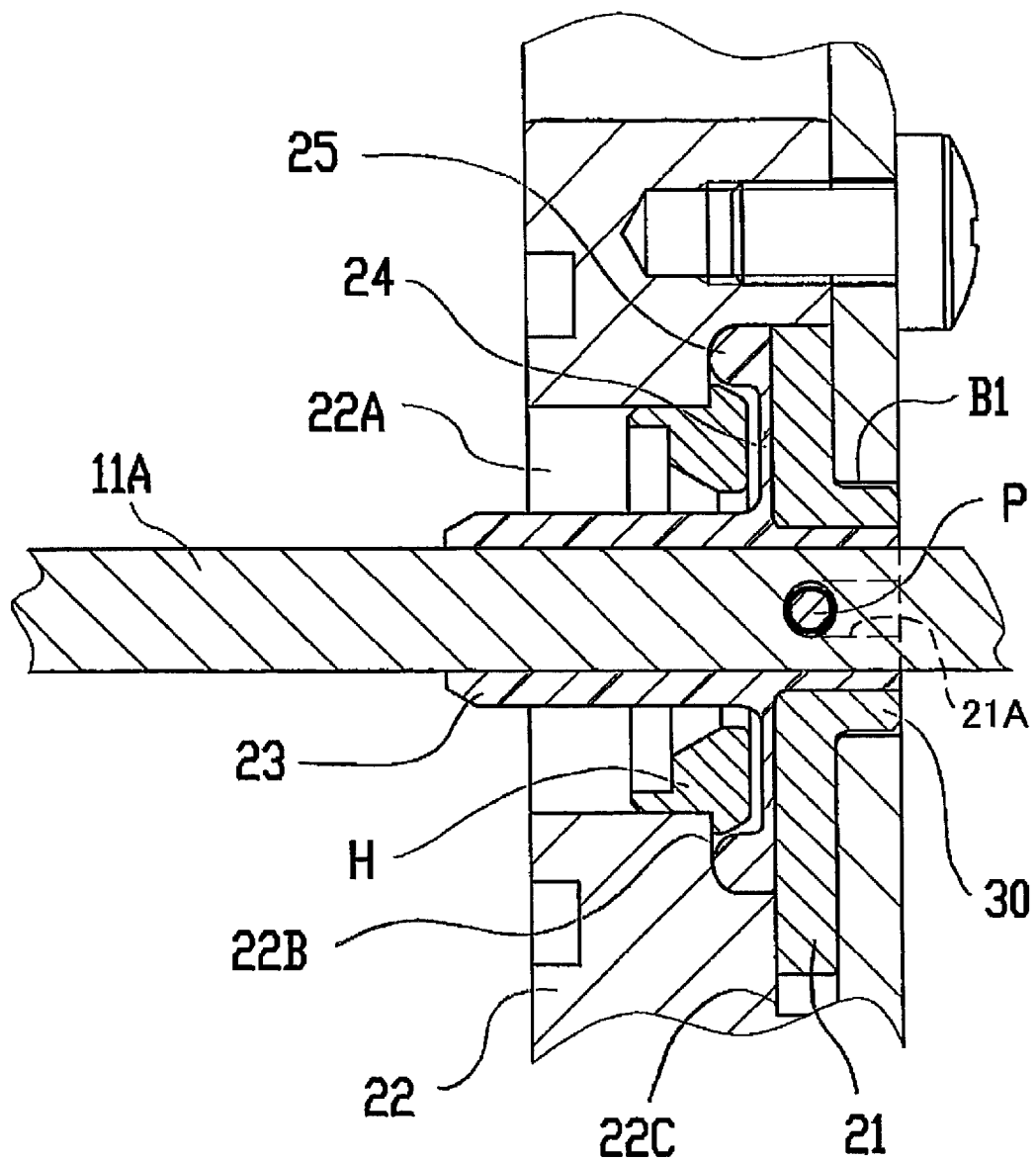
FIG. 13 is a cross-sectional view illustrating another embodiment of the sealing member in an enlarged manner.
Figure 14:
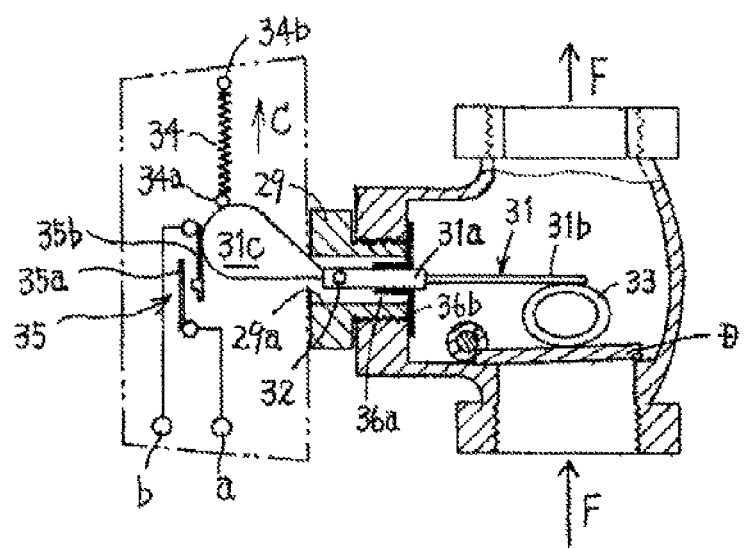
FIG. 14 is a cross-sectional view illustrating an example of a typical water flow detection device.

FIG. 1 is a cross-sectional view illustrating a water flow detection device according to an embodiment of the invention. FIG. 2 is a cross-sectional view illustrating the water flow detection device taken along a line X-X in FIG. 1. FIG. 3 is a cross-sectional view illustrating the water flow detection device taken along a line Y-Y in FIG. 2. FIG. 4 is a cross-sectional view illustrating a housing in FIG. 3 in an enlarged manner. FIG. 5 illustrates the vicinity of a retainer in FIG. 4 in an enlarged manner. FIG. 6 illustrates the vicinity of a seal in FIG. 5 in an enlarged manner. FIG. 7 illustrates a state in which the detection rod in FIG. 5 rotates. FIG. 8 is a partially assembled view illustrating an extended block and a retainer. FIG. 9 illustrates an embodiment in which a holder has a hole of an elongated shape. FIG. 10 illustrates another embodiment of the retainer. FIG. 11 illustrates an embodiment of a case that holds a pin. FIG. 12 is a cross-sectional view illustrating other embodiments of a sealing member and a washer in an enlarged manner. FIG. 13 is a cross-sectional view illustrating another embodiment of the sealing member in an enlarged manner.

A water flow detection device A according to an embodiment of the invention and illustrated in FIGS. 1 to 3 includes a main body 1, a housing 2, and a drain valve 3.

The main body 1 has a hollow and cylindrical shape and has a partition 4 that divides the inside of the main body 1 into a primary chamber I and a secondary chamber II. A communication hole 5 is formed through the partition 4, and an annular valve seat 6 is provided on the partition 4 at the side of the secondary chamber II.

A disk-shaped valve body 7 is seated on the valve seat 6, and a cylindrical bearing 8 is formed on part of the periphery of the valve body 7, and a valve shaft 9 is inserted into the bearing 8. The valve shaft 9 horizontally extends inside the main body 1 and is held by the main body 1. The valve body 7 has a structure of a check valve and is capable of rotating around the valve shaft 9 as a rotational shaft in a direction toward the secondary chamber II. The valve body 7 rotates in the direction toward the secondary chamber II and then separates from the valve seat 6, so that a fluid in the primary chamber I is capable of passing through the annular valve seat 6 to flow into the secondary chamber II.

A protrusion 10 is provided at the periphery of the valve body 7, the protrusion 10 being formed so as to project from the periphery (FIGS. 2 and 3). An end 11A of a detection rod 11 contacts a surface of the protrusion 10 at the side of the valve seat 6. The detection rod 11 is intermediately supported by a pin P (FIG. 4) and is capable of rotating in a longitudinal direction in the drawing. In cases where the end 11A of the detection rod 11 contacts the valve body 7, the detection rod 11 is in a substantially horizontal state.

A flange F is formed at the tip of the end 11A of the detection rod 11, and the periphery of the flange F has a rounded shape. The rounded shape is provided, so that the detection rod 11 rotates in conjunction with the opening movement of the valve body 7. The flange F moves so as to slide over a surface of the protrusion 10 until the detection rod 11 separates from the protrusion 10 of the valve body 7, and therefore the rounded shape provides an advantageous effect that the detection rod 11 is capable of smoothly sliding over the protrusion 10. The flange F may have a spherical shape in place of a disk-like shape.

An end 11B of the detection rod 11 protrudes to the outside of the main body 1 and is covered with the housing 2, the end 11B being opposite to the end that contacts the valve body 7. With reference to FIGS. 4 and 5, the end 11B has a column-like spring washer 12 that is provided so as to protrude to the upper side of the drawings, and a spring washer 13 that is fixed to a base B is provided so as to be positioned above the spring washer 12 in the drawings. A coil spring 14 is provided as an elastic main body between both the spring washers 12 and 13.

The spring washer 12 has a column-like shape and has an external thread 12A that is formed at an end thereof. The external thread 12A threadably engages with an internal thread 11C that is formed at the end 11B of the detection rod 11. The external thread 12A and the internal thread 11C are placed in a direction orthogonally intersecting the pin P. A step 12B is formed at an intermediate portion of the spring washer 12, and an end of the coil spring 14 is seated on the step 12B. A column portion 12C is provided on the step 12B and is inserted into the inside of the coil spring 14. The spring washer 13 also has an external thread 13A, a step 13B, and a column portion 13C as in the case of the spring washer 12.

In a state in which the end 11A of the detection rod 11 contacts the valve body 7, ends of the column portions 12C and 13C contact each other or are close to each other with a slight distance therebetween. Then, in a state in which the valve body 7 opens with the result that the end 11A of the detection rod 11 separates from the valve body 7, the end 11B of the detection rod 11 receives an urging force from the coil spring 14 and then rotates around the pin P as the rotational shaft from a horizontal state to the lower side as illustrated in FIG. 7. Therefore, the column portion 12C moves so as to separate from the column portion 13C. For the reason that a limit switch pressing piece 15 and a contact 16 are prevented from being broken as a result of abnormal rotation of the end 11B of the detection rod 11, the ends of the column portions 12C and 13C are normally positioned so as to contact each other or so as to be close to each other. Namely, for example, in cases where a foreign object is positioned between the end 11A of the detection rod 11 and the valve body 7, even if a problem is caused in which the end 11A of the detection rod 11 rotates from a horizontal state toward the side of the partition 4, the column portions 12C and 13C interfere with each other to restrict the rotation of the detection rod 11.

The coil spring 14 normally urges the end 11B of the detection rod 11 downward in the drawing. Accordingly, an urging force is applied such that the end 11A, which is on the side opposite to the end 11B, rotates around the pin P as a rotational shaft to the upper side in the drawings, namely in a direction in which the valve body 7 opens. However, the urging force of the coil spring 14 is applied in such a small amount that the valve body 7 does not open.

The contact 16 that is in contact with the limit switch pressing piece 15 is fixedly provided at the end 11B of the detection rod 11. The contact 16 urges the limit switch pressing piece 15 in a direction in which the limit switch pressing piece 15 is distanced from a limit switch 17. The contact 16 is provided so as to be held between the spring washer 12 and the end 11B of the detection rod 11.

A delay mechanism 18 is provided at a position in a direction in which the contact 16 urges the limit switch pressing piece 15. The delay mechanism 18 serves to delay the operation of the limit switch pressing piece 15 and employs a configuration utilizing an air damper or oil damper. The operation of the delay mechanism 18 will be hereinafter described.

The pin P that is illustrated in FIGS. 4 to 8 and that supports the detection rod 11 is provided so as to intersect the center of a hole 20, the hole 20 being provided at the center of a plate-like retainer 21. A groove-like bearing 21A is carved on one side of the retainer 21 to accommodate the pin P. The pin P is configured so as not to be come out of the bearing 21A owing to a washer 27 that will be hereinafter described.

The retainer 21 is provided between the base B of the housing 2 and an extended block 22. The extended block 22 is a member that connects the main body 1 to the housing 2. The extended block 22 is also capable of being produced so as to be integrated with the main body 1 of the water flow detection device A, and the production with the integration enables the number of components to be decreased, thereby providing an effect of reduced costs. On the other hand, as in the case of this embodiment, the extended block 22 is capable of being produced as an independent component and fixed to the housing 2, so that the housing 2 is capable of being provided as a unit product, and therefore the housing 2 is capable of being removed from the main body 1 for the purpose of maintenance and replacement.

The extended block 22 has a plurality of bolt through-holes 221 used for fixing the extended block 22 to the main body 1 with bolts. Although not illustrated in the drawings, the main body 1 has internal threads at positions corresponding to the bolt through-holes 221.

A hole 22A is formed inside the extended block 22 so as to be in connection with the secondary chamber II of the main body 1, the retainer 21 is disposed such that a sealing member 23 is interposed between the retainer 21 and steps 22B, the steps 22B being formed at an intermediate portion of the hole 22A. The sealing member 23 keeps the inside of the main body 1 filled with water in a liquid-tight state with respect to the inside of the housing 2.

A groove 22C is formed in the housing 2 side surface of the extended block 22, the groove 22C being provided as a "retainer-holding unit" that holds the retainer 21 at a predetermined position. The groove 22C engages with a protrusion 21B formed in the peripheral surface of the retainer 21, so that the retainer 21 is held at a predetermined position on the extended block 22. Therefore, the retainer 21 is capable of being prevented from being displaced and oscillating, and furthermore an axis of the pin P that is disposed at the bearing 21A of the retainer 21 is horizontally positioned so as to orthogonally intersect a direction of a flow in the water flow detection device A. Accordingly, in the detection rod 11 that is supported by the pin P, the ends 11A and 11B are capable of rotating in parallel with the direction of a flow.

In addition to the configuration of the embodiment, the configuration in which the retainer 21 engages with the extended block 22 may employ another configuration in which a hollow portion is formed in an outer surface of the retainer 21 and in which an engagement protrusion corresponding to the hollow portion is formed on the extended block 22. Furthermore, yet another configuration may be employed, in which the profile of the retainer 21 is formed into a polygonal shape and in which an engagement hollow portion corresponding to such a shape is formed in the extended block 22. Moreover, the retainer 21 and the extended block 22 may be positioned at predetermined positions and may be fixed with a plurality of screws and the like.

The sealing member 23 has a cylindrical shape, is formed with a material having elasticity, such as rubber, and deforms in response to the rotation of the detection rod 11. The detection rod 11 is inserted into the cylindrical portion of the sealing member 23. During the production of the sealing member 23, the sealing member 23 may be formed while the detection rod 11 is embedded into the sealing member 23, thereby providing a product having an integrated configuration. In cases where knurling is formed on a surface of the detection rod 11 at a position at which the sealing member 23 is provided, the sealing member 23 is capable of being prevented from being removed.

A thin collar 24 is formed at an end of the sealing member 23 at a side of the retainer 21, the thin collar 24 extending in a direction orthogonally intersecting the axis of the cylindrical portion. Protrusions 25 are formed at the periphery of the collar 24, the protrusion 25 projecting toward the extended block 22 and being concave in cross-section. The protrusions 25 are held between the retainer 21 and the extended block 22.

Even if the rotation of the detection rod 11 causes a load to be imposed on the sealing member 23, the sealing member 23 elastically deforms owing to the elasticity of the collar 24, so that the sealing member 23 is prevented from being broken. The protrusions 25 that are formed at the periphery of the collar 24 are held between the retainer 21 and the extended block 22 to be fixed, and therefore a problem is capable of being prevented, in which the rotation of the detection rod 11 leads to removal of the sealing member 23 and then leads to water leakage.

A cylindrical holder H is provided between the collar 24 and the extended block 22. In cases where the water flow detection device A is installed, a pipe on the secondary side is filled with water. However, in this case, compressed air remains in the secondary-side pipe due to air pockets. The compressed air causes reduced sensitivity of the detecting of a water flow in the water flow detection device A, and therefore in cases where an effect of such a problem is concerned, the secondary-side pipe that has been filled with water may be subjected to vacuum extraction with a vacuum pump to remove the remaining air. However, the sealing member 23 may be drawn in a direction of the secondary chamber II of the main body 1 by the vacuum extraction for the secondary-side pipe, thereby being displaced from a correct position. In cases where the sealing member 23 is displaced from the correct position, airtightness may be unable to be maintained in the secondary-side pipe. The holder H is provided to restrict such unwanted displacement of the sealing member 23. Accordingly, an end of the holder H is positioned so as to contact or be close to the collar 24. Steps are formed at the periphery of the holder H, and the steps engage with the steps 22B of the extended block 22, so that unwanted displacement of the holder H and sealing member 23 is prevented.

The holder H has a taper-like inner periphery that extends toward the main body 1 in a manner of funnel, and therefore the holder H does not interfere with the rotation of the detection rod 11. Although a hole having the shape of a precise circle is formed on the inner periphery of the holder H, the hole is preferably provided in the form of an elongated hole H1 as in an embodiment illustrated in FIG. 9, for example. The elongated hole H1 is formed so as to have a width that is slightly larger than the external diameter of the detection rod 11, thereby providing an advantageous effect that the rotation of the detection rod 11 is restricted in a direction orthogonally intersecting a direction of a flow. More specifically, in the water flow detection device A, generation of signals by the limit switch 17 is controlled by the rotation of the detection rod 11, the rotation being in conjunction with the opening of the valve body 7. Unfortunately, in cases where the detection rod 11 rotates in a direction orthogonally intersecting the direction of a flow while unsteadily oscillating, the amount of the rotation of the detection rod 11 does not accurately correspond to the amount of the rotation of the valve body 7 with the result that variation may be caused in the generation of the signals by the limit switch 17. However, such a problem is capable of being prevented in the embodiment. Furthermore, the rotating detection rod 11 is configured so as to abut on two ends of the elongated hole H1 in a longitudinal direction, so that the amount (angle) of the rotation is capable of being restricted during the rotation in a direction parallel to the direction of a flow.

Two washers 26 and 27 into which the detection rod 11 is inserted are attached between the collar 24 of the sealing member 23 and the retainer 21. The two washers 26 and 27 are attached such that the surfaces, which face each other, of the washers 26 and 27 contact each other. The washers 26 and 27 are provided, and therefore the contacting surfaces of the washers 26 and 27 slide over each other during the rotation of the detection rod 11 with the result that the detection rod 11 smoothly rotates, and a load imposed on the collar 24 during the rotation of the detection rod 11 is decreased. The washer 27 that contacts the retainer 21 supports the collar 24 of the sealing member 23 with a flat surface having an even profile, the collar 24 being exposed to an influence of water pressure. In cases where the washer 27 is not provided, the collar 24 may break into the bearing 21A of the retainer 21 and may be therefore broken by water pressure applied from the side of the main body 1. However, in the embodiment, the washer 27 functions so as not to expose an irregular structure, which includes the bearing 21A, of the retainer 21 to the collar 24, so that such a problem does not occur. Accordingly, the external diameter of the washer 27 is configured so as to be equal to that of the collar 24. On the other hand, the inner diameter of the washer 27 is configured so as to secure a gap having such a size that does not restrict the rotation of the detection rod 11. The washer 26 that contacts the sealing member 23 has an inner diameter approximately equal to that of the detection rod 11 and has an external diameter smaller than that of the washer 27. In cases where the washer 26 is not provided, the collar 24 may break into a gap between the washer 27 and the detection rod 11 and may be therefore broken, the collar 24 being exposed to water pressure. However, in the embodiment, the gap is covered with the washer 26 having the inner diameter approximately equal to that of the detection rod 11, and therefore such a problem does not occur.

A resin coating is applied on a surface of each of the washers 26 and 27. The resin coating is applied for the purpose of enhancing lubrication properties between the washers 26 and 27, thereby providing advantageous effects that the washers 26 and 27 smoothly slide over each other during the rotation of the detection rod 11 and that the rotation of the detection rod 11 is not therefore prevented. Plate processing or paint application/coating which has an effect that enables the washers 26 and 27 to smoothly slide over each other may be performed as well as the resin coating.

A surface of the collar 24 of the sealing member 23 is positioned so as to be parallel to a surface of the retainer 21 with interposing the washers 26 and 27 therebetween. In cases where pressure of water in the main body 1 is applied to the collar 24, the collar 24 and the projection 25 are closely contact the washer 27 and the extended block 22 respectively, thereby enhancing a water proof effect.

Furthermore, a step 30 is formed on a surface of the retainer 21 so as to extend from the periphery of the hole 20 to the base B, the surface facing the base B. The step 30 is inserted into a hole B1 of the base B and is configured so as to have an appropriate positional relationship with the limit switch 17 or the like disposed on the base B. A hole is provided within the step 30 and is formed in a tapered manner in which the hole enlarges toward the end 11B of the detection rod 11, so that the detection rod 11 does not interfere with the inner periphery of the step 30 when the detection rod 11 rotates.

The drain valve 3 is provided for the purpose of discharging a fluid in the main body 1 to the outside during check or maintenance and is provided adjacent to the housing 2. The inner structure of the drain valve 3 employs a structure of an angle valve, and a drain outlet is provided so as to be oriented downward in FIG. 1. A handle for opening and closing the drain valve 3 is provided on the front side so as to be placed at a position at which the handle is easily operated.

Subsequently, the operation of the water flow detection device A of the embodiment will be described.

The water flow detection device A is provided on a pipe of fire-fighting equipment. The primacy chamber I is connected to a pipe that is in connection with a water supply device such as a pump or in connection with a water source such as a water storage tank, each being not illustrated. An end of a pipe that is connected to the secondary chamber II is attached to a sprinkler head that is not illustrated.

The fire-fighting equipment is filled with water, and the primary chamber I and secondary chamber II in the main body 1 of the water flow detection device A are also filled with water. In a normal state, the valve body 7 is seated on the valve seat 6, and a water flow from the primary chamber I to the secondary chamber II is prevented. Furthermore, the detection rod 11 that contacts the valve body 7 is in a substantially horizontal state.

In cases where the sprinkler head connected to the pipe that is in connection with the secondary chamber II operates in response to the occurrence of fire, the water in the pipe connected to the secondary chamber II is discharged from the sprinkler head, thereby gradually reducing the pressure of the water. The pressure of the water in the secondary chamber II enables the valve body 7 to be closed and is reduced with the result that the valve body 7 is pushed by the action of the pressure of the water inside the primary chamber I, thereby rotating the valve body 7 around the valve shaft 9.

The valve body 7 separates from the valve seat 6 and then opens, thereby supplying the water in the primary chamber I to the secondary chamber II. Then, the detection rod 11 that is in contact with the valve body 7 also rotates around the pin P by receiving an urging force from the coil spring 14, and the end 11B of the detection rod 11 rotates downward from a horizontal state as illustrated in FIG. 7, the end 11B being positioned on the side of the housing 2.

Then, the contact 16 provided at the end 11B of the detection rod 11 moves away from the limit switch pressing piece 15, and then the limit switch pressing piece 15 starts to move toward the limit switch 17. The delay mechanism 18 enables the limit switch pressing piece 15 to reach the limit switch 17 after the passage of predetermined time, and then the limit switch 17 is actuated. Signals from the limit switch 17 are transferred to a monitoring apparatus installed in an administrative room through a lead wire connected to a terminal block provided in the housing 2.

The pump described above is operated by receiving the signals from the limit switch 17, and water is supplied from a water source to the sprinkler head that has operated in response to the occurrence of fire, and then the sprinkler head continuously disperses the water to bring a fire under control.

Subsequently, the operation and advantageous effects of the water flow detection device A of the embodiment will be described except those which have been described above.

The water flow detection device A includes the retainer 21 and the extended block 22 as "holding members" that hold the pin P of the detection rod 11 such that the pin P is parallel to the valve shaft 9 of the valve body 7, the extended block 22 holding the retainer 21 to fix the retainer 21 to the main body 1 with bolts. The retainer 21 and the extended block 22 respectively have the protrusion 21B and the groove 22C as "rotation-restricting sections", and these structures engage with each other. Accordingly, the pin P that functions as the rotational shaft of the detection rod 11 is capable of being provided so as to be constantly parallel to the valve shaft 9 that functions as a valve stem of the valve body 7. Therefore, the detection rod 11 contacts the valve body 7 without being inclined, so that the amount of the movement of the detection rod 11 is capable of being held constant during the rotation of the detection rod 11. Accordingly, the opening of the valve body 7 due to water flowing in the pipe is capable of being constantly detected by the rotational movement of the detection rod 11 in an accurate manner, thereby being able to provide the water flow detection device A having high reliability of detecting operation. Especially, a water flow detection device A having high reliability of detecting operation and having a structure of an actuated valve is capable of being provided, such a water flow detection device A being also able to be applied to one of a type having a relatively large diameter of approximately 65 A (1½")~200 A (8").

The water flow detection device A includes the coil spring 14 as an "urging unit" that urges the detection rod 11 in a direction in which the valve body 7 opens. Accordingly, the detection rod 11 does not impose a closing load on the valve body 7, while the valve body 7 rotates in conjunction with the rotation of the detection rod 11 during the closing and opening of the valve body 7 with the result that a water flow is detected. Therefore, also owing to this advantage, the water flow detection device A having high reliability of detecting operation and having a structure of an actuated valve is capable of being provided, such a water flow detection device A being also able to be applied to one of a type having a relatively large diameter.

Subsequently, other embodiments of the water flow detection device A according to the embodiment will be described except those which have been described above.

In the above embodiment, an example has been described, in which the engagement configuration including the protrusion 21B of the retainer 21 and the groove 22C of the extended block 22 stops rotation of the retainer 21 with the result that the pin P that supports the detection rod 11 is disposed so as to be parallel to the valve shaft 9 of the valve body 7. However, for example, as illustrated in FIG. 10, the retainer 21 may have the protrusion 21B formed on a surface thereof that faces the base B of the housing 2, and the base B may have a hole (not illustrated) that is formed so as to engage with the protrusion 21B, and the engagement configuration of such rotation-restricting sections may stop rotation of the retainer 21 and pin P.

In the above embodiment, an example has been described, in which the pin P that supports the detection rod 11 is held by the bearing 21A provided for the retainer 21. However, for example, as illustrated FIG. 11, a hollow portion that serves as a bearing to hold the pin P is formed in the base B of the housing 2, thereby being able to exclude usage of the retainer 21.

In the above embodiment, an example has been described, in which the two washers 26 and 27 are provided between the collar 24 of the sealing member 23 and the retainer 21. However, for example, embodiments are provided as illustrated in FIGS. 12 and 13, thereby being able to exclude usage of the washers 26 and 27.

Namely, in another embodiment illustrated in FIG. 12, a cylindrical protrusion is formed on the sealing member 23 made of a rubber-like elastic main body such as silicone rubber in order to seal the hole 20 of the retainer 21, thereby excluding usage of the washer 26. In the above embodiment, a gap is secured between the washer 27 and the detection rod 11 to preclude restriction of rotational movement of the detection rod 11, and the washer 26 is used to prevent the sealing member 23 from breaking into the gap. However, in this embodiment, the configuration in which the gap allows the detection rod 11 to rotationally move is not employed, and a configuration is employed, in which the shape of the sealing member 23 elastically changes with the result that the detection rod 11 is capable of rotationally moving. Accordingly, usage of the washer 26 is precluded. In this embodiment, the protrusion formed on the sealing member 23 has a through-hole into which the pin P is inserted, and the through-hole is formed in a direction orthogonally intersecting an axis of a cylindrical structure of the protrusion (not illustrated).

Furthermore, in another embodiment illustrated in FIG. 13, the usage of the washers 26 and 27 is precluded to decrease the number of components to be used. Namely, in this embodiment, a groove-like bearing 21A is formed in the retainer 21, the groove-like bearing 21A holding the pin from the side of the base B of the housing 2. In the above embodiment using the washer 27, the collar 24 of the sealing member 23 is exposed to water pressure from the main body 1 and then may break into the groove-like bearing 21A formed in the retainer 21 with the result that the collar 24 is broken, and the washer 27 is used as a lid of the bearing 21A to prevent such breakage of the collar 24. However, in this embodiment illustrated in FIG. 13, the bearing 21A does not face the collar 24 of the sealing member 23 and is formed as a groove that opens toward the base B, and therefore the above problem is capable of being precluded. Usage of the washer 27 is excluded, and the protrusion the same as that of FIG. 12 is formed on the sealing member 23, and therefore usage of the washer 26 is excluded. Furthermore, in place of the groove-like bearing 21A that opens toward the base B as illustrated FIG. 13, an opening is formed so as to penetrate in a direction orthogonally intersecting an axis of a cylindrical structure of the retainer 21, thereby similarly being able to exclude usage of the washers 26 and 27. Moreover, the protrusion formed on the sealing member 23 as illustrated in FIG. 13 also has a through-hole into which the pin P is inserted, and the thorough-hole is formed in a direction orthogonally intersecting an axis of a cylindrical structure of the protrusion (not illustrated).

INDUSTRIAL APPLICABILITY

Embodiments of the invention are applied to a water flow detection device having a structure of a check valve and are also capable of being applied to a flow switch that includes a paddle provided at an end of a detection rod, the flow switch detecting the swinging motion of the paddle in response to a water flow in a pipe and then outputting signals.

REFERENCE SIGNS LIST

A water flow detection device
1 main body
2 housing
3 drain valve
6 valve seat
7 valve body
8 bearing
9 valve shaft
11 detection rod
12 and 13 spring washer
14 coil spring
15 limit switch pressing piece
16 contact
17 limit switch
18 delay mechanism
21 retainer
22 extended block
23 sealing member
26 and 27 washer

The invention claimed is:
1. A water flow detection device comprising:
a main body having a valve body that employs a structure of a swing check valve;
a detection rod provided so as to pass through the main body from the inside of the main body to the outside, the detection rod being rotatably supported by a pin having an axial direction that orthogonally intersects a direction in which water flows;
an urging unit that urges the detection rod such that the detection rod contacts the valve body;
a switch that outputs signals in response to the rotation of the detection rod, wherein
the pin that supports the detection rod is provided inside a hollow retainer,
the retainer is disposed between the main body and the switch, and
the retainer has a holding unit that holds the pin at a position at which the axial direction of the pin intersects the direction in which water flows; and an extended block provided between the main body and the switch, the extended block having a receiving portion that mates with an engagement portion formed on a surface of the retainer as the holding unit, wherein the engagement portion is provided in the form of any of a protrusion, a hole, and a cutout.

2. The water flow detection device according to claim 1, wherein the housing that accommodates the switch is provided so as to be able to be removed from the main body.

3. The water flow detection device according to claim 1, wherein
a sealing member is provided on the retainer,
the sealing member has a cylindrical portion into which the detection rod is inserted and has a collar that extends in a direction vertical to an axis of the cylindrical portion, and
the periphery of the collar is held between the retainer and the extended block.

4. The water flow detection device according to claim 1, wherein a case-side end of the retainer is inserted into a hole formed in the housing.

5. The water flow detection device according to claim 1, wherein
an elastic main body is provided at an case-side end of the detection rod,
the elastic main body is fixed to each of spring washers provided on the detection rod and inside the housing, and
each of the spring washers has a rotation amount-controlling unit that controls the rotation amount of the detection rod.

6. The water flow detection device according to claim 1, wherein
a flange is formed at the body-side end of the detection rod, and
the periphery of the flange has a rounded shape.

7. The water flow detection device according to claim 1, wherein
a sealing member is provided on the retainer,
the sealing member has a cylindrical portion into which the detection rod is inserted and has a collar that extends in a direction vertical to an axis of the cylindrical portion, and
a surface of the collar is positioned so as to be parallel to a surface of the retainer.

8. The water flow detection device according to claim 7, wherein
two washers are interposed between the collar of the sealing member and the retainer, and
the two washers are provided such that surfaces of the two washers contact each other.

9. The water flow detection device according to claim 8, wherein a coating is applied to a surface of each of the washers.

10. The water flow detection device according to claim 7, further comprising a cylindrical holder that restricts the movement of the sealing member toward the main body.

11. The water flow detection device according to claim 10, wherein the holder has a hole of an elongated shape.

12. A water flow detection device comprising:
a cylindrical main body having a valve body that employs a structure of a swing check valve and having a valve stem;
a detection rod provided so as to pass through the main body from the inside of the main body to the outside, the detection rod rotating in conjunction with opening and closing of the valve body;
a pin that supports the detection rod such that the detection rod is capable of rotating; and
a switch that outputs signals in response to the rotation of the detection rod,
wherein
the pin is held by a holding member so as to be parallel to the valve shaft of the valve body,
the holding member has a rotation-restricting section that prevents rotation of the holding member with respect to the main body,
the holding member includes a retainer and an extended block, the retainer having any of a groove and an opening that holds the pin, and the extended block holding the retainer to fix the retainer to the main body, and
the rotation-restricting section includes a protrusion and a hollow portion that are individually provided on surfaces of the retainer and extended block, the surfaces being positioned so as to face each other.

13. The water flow detection device according to claim 12, further comprising an urging unit that urges the detection rod in a direction in which the valve body opens.

14. A water flow detection device comprising:
a cylindrical main body having a valve body that employs a structure of a swing check valve and having a valve stem;
a detection rod provided so as to pass through the main body from the inside of the main body to the outside, the detection rod rotating in conjunction with opening and closing of the valve body;
a pin that supports the detection rod such that the detection rod is capable of rotating; and
a switch that outputs signals in response to the rotation of the detection rod,
wherein
the pin is held by a holding member so as to be parallel to the valve shaft of the valve body,
the holding member has a rotation-restricting section that prevents rotation of the holding member with respect to the main body,
the holding member includes a retainer and includes a housing in which the switch is provided, the retainer having any of a groove and an opening that holds the pin, and the housing facing the retainer, and
the rotation-restricting section includes a protrusion and a hollow portion that are individually provided on surfaces of the retainer and housing, the surfaces being positioned so as to face each other.

15. A water flow detection device comprising:
a cylindrical main body having a valve body that employs a structure of a swing check valve and having a valve stem;
a detection rod provided so as to pass through the main body from the inside of the main body to the outside, the detection rod rotating in conjunction with opening and closing of the valve body;
a pin that supports the detection rod such that the detection rod is capable of rotating; and
a switch that outputs signals in response to the rotation of the detection rod,
wherein
the pin is held by a holding member so as to be parallel to the valve shaft of the valve body,
the holding member has a rotation-restricting section that prevents rotation of the holding member with respect to the main body, the holding member is a housing in which the switch is provided, the housing having any of a groove and an opening that holds the pin, and the rotation-restricting section includes a protrusion and a hollow portion that are individually provided on surfaces of the housing and main body, the surfaces being positioned so as to face each other.

* * * * *